(12) United States Patent
Hammer et al.

(10) Patent No.: US 6,186,407 B1
(45) Date of Patent: Feb. 13, 2001

(54) HUMIDITY CONTROL BASED ON AN ESTIMATION USING HEATING PLANT CYCLE, OF INSIDE WINDOW SURFACE TEMPERATURE

(75) Inventors: Jeffrey M. Hammer, Wayzata; Timothy J. Kensok, Minnetonka; Mark E. Stout; Russell A. Straate, both of Plymouth; Timothy M. Tinsley, Coon Rapids, all of MN (US)

(73) Assignee: Honeywell International Inc., Morristown, NJ (US)

( * ) Notice: Under 35 U.S.C. 154(b), the term of this patent shall be extended for 0 days.

(21) Appl. No.: 09/312,555

(22) Filed: May 14, 1999

(51) Int. Cl.$^7$ ............................... B01F 3/02; G05D 21/00
(52) U.S. Cl. ......................................... 236/44 C; 165/222
(58) Field of Search ........................... 236/44 A, 44 C, 236/44 R, 11; 165/222

(56) References Cited

U.S. PATENT DOCUMENTS

| | | | |
|---|---|---|---|
| 3,279,699 | * 10/1966 | Nelson | 236/44 C |
| 4,526,011 | * 7/1985 | Logan et al. | 62/176.1 |
| 5,341,986 | * 8/1994 | Galba et al. | 236/44 C |
| 5,351,855 | * 10/1994 | Nelson et al. | 236/44 C |
| 5,651,498 | * 7/1997 | Mayer et al. | 236/44 C |

* cited by examiner

*Primary Examiner*—Corrine McDermott
*Assistant Examiner*—Mohammad M Ali
(74) *Attorney, Agent, or Firm*—Charles L. Rubow

(57) ABSTRACT

A humidity control system for an enclosure requiring heat from a furnace and having one or more windows, includes sensors for the enclosure temperature and humidity, and a means for measuring the percentage of time which the furnace is operating (load factor). The system estimates the interior window temperature based on these parameters and controls humidity added to the enclosure air to prevent the enclosure air dew point temperature from rising above the estimated window temperature. This prevents condensation on the window surfaces. The estimation can be adjusted to compensate for different insulation characteristics of the window. In a preferred embodiment, the enclosure air temperature and humidity are derived from sensors conveniently located in the return air duct.

13 Claims, 3 Drawing Sheets

ABBREVIATIONS $T_S$ - Latest furnace run start time
$T_F$ - Latest furnace run end time
$T_R$ - Latest furnace run time
$T_O$ - Latest furnace off time
$LF_O$ - Old load factor
$LF_N$ - New load factor $LF_I$ - No. of consecutive max. load factor increments
$LF_D$ - No. of consecutive max. load factor decrements
$T_E$ - Enclosure temperature
$RH_E$ - Enclosure relative humidity
$T_{DP}$ - Enclosure dew point temperature
$T_C$ - Current time per system clock

HUMIDITY CONTROL BASED ON AN ESTIMATION USING HEATING PLANT CYCLE, OF INSIDE WINDOW SURFACE TEMPERATURE

BACKGROUND OF THE INVENTION

One of the qualities of air within a space which makes that air more comfortable is its relative humidity (RH).

Experts generally agree that 70° F. and 50% RH is perfect for most people, but somewhat lower temperature is acceptable particularly if the RH is near the ideal.

RH is the percentage of water vapor partial pressure in existing air to the saturation pressure of water vapor at the existing air temperature. As air temperature increases, RH decreases. Dew point temperature is the temperature at which RH becomes 100%, and is the temperature at which water vapor begins to condense from the air. There is a single dew point for every ratio of water vapor mass to air mass at a given pressure. These are well known principles, taught in every college thermodynamics and physics course series.

During hot summers in more humid areas the relative humidity tends to be too high, and air conditioning is commonly used to remove the excess humidity from the air. On the other hand, in colder climates during the heating season, maintaining adequate humidity is difficult. The low temperature of the outside air dramatically lowers the total amount of water vapor on a per unit mass of air basis, which the air can hold. Either intentionally or because of inherent leaks in the structure, the interior air is constantly replaced by this dry outside air. This causes the humidity level within the heated space to fall to uncomfortably low levels. For example, air at −20° F. and 100% RH when heated to 70° F. has RH of less than 10%, which is uncomfortably low. This is why people's skin tend to dry out so much when it's cold outside.

The response for many years to correct this situation has been to use a humidifier to add water vapor to the air. Cheapest are the small stand-alone humidifiers which are placed in a room to increase the air's humidity level. These require constant filling which is time-consuming and provides the "opportunity" for spilled water. Further, it is hard to accurately regulate the humidity level of a room served by a stand-alone humidifier. And a room humidifier provides humidity for little more than the room in which it's located. In a space having a number of rooms, room humidifiers are far too inconvenient for most people.

Another type of humidifier (in-duct) is installed in the heating system ductwork leading from a forced air type furnace. In-duct humidifiers are supplied with water from the structure's water supply, and hence require much less attention. A humidistat or humidity control can control the operation of the humidifier so that humidity level can be held to a preset value.

Particularly with in-duct humidifiers, the issue of too high humidity is important during heating seasons because of condensation on windows. Window surfaces are typically the coldest interior surfaces in the heated space, because they are the most poorly insulated. When the interior surface temperature of a window falls to a point below the dew point temperature in the space then condensation on the interior window surface occurs. If the difference between interior window surface temperature and dew point temperature is too high, so much condensation can occur that moisture runs onto the window frames, which can easily damage them over time. Therefore, it is necessary to limit the interior humidity level to a value whose dew point is below the window surface temperature. On the other hand, when the outside temperature is very low, the more closely enclosure dew point temperature can be held to just below window temperature, the more comfortable will be the interior space.

This is easier said than done for a number of reasons. In the first place, the changing outdoor temperature changes the window temperature and hence the maximum amount of water vapor acceptable in the interior's air. The changing outdoor temperature also changes the amount of water vapor in the outdoor air which replaces the indoor air. And temperature setbacks programmed into thermostats for energy-saving purposes can also dramatically affect the inside air temperature. While indoor air temperature does not affect its dew point, indoor air temperature does affect the window surface temperature. If for example indoor air temperature decreases, then the window surface temperature falls. If window temperature falls to below the dew point temperature of the air, then water vapor in the air will condense on the window surface.

It would of course be possible to directly measure the inside window surface temperature, the inside air temperature, and the inside RH, and calculate from the latter two the dew point. This approach can theoretically provide the most accuracy in controlling the inside RH to prevent window condensation. Unfortunately, there is no presently available device for conveniently measuring inside window surface temperature, and doing so may well be difficult.

A variation on direct window surface temperature measurement relies on an estimate of inside window surface temperature. It is known that the inside window temperature closely depends on the inside and outside air temperatures, so it is possible to estimate window surface temperature using these values. Inside air temperature is easy to measure of course. But outside air temperature is more difficult to measure for a number of reasons. Simply installing the outside sensor is expensive. Then too, if the outside sensor is not shielded from the sun and even the house, the measured value may not accurately reflect outside temperature. An outside sensor requires long leads, and these may be subject to noise, further degrading the accuracy.

Thus, the present state of the art does not provide inexpensive and accurate means for control of humidity within heated spaces so that indoor dew point temperature is consistently close to but still below the window temperature. As a result, in many installations, the indoor dew point may on occasion rise above the window temperature, causing condensation to form on windows. Other times, the humidity level may be held lower than is necessary, causing discomfort and even health problems for occupants.

BRIEF DESCRIPTION OF THE INVENTION

We have found that it is not necessary to directly measure the outside air temperature in order to determine the inside window temperature with sufficient accuracy to adequately control enclosure humidity. We have developed a means of approximating the inside window temperature using only parameters associated with the heating plant or furnace, and if more precision is desired, parameters associated with the indoor air as well. Using an approximation of this type, we can consistently control inside humidity to prevent window condensation, and at the same time hold inside dew point temperature slightly below the maximum value possible to avoid window condensation and below say 45 or 50° F.

Our invention is implemented in a humidity controller for a forced air heating system. The system has a furnace and some means for providing a furnace operation signal. A discharge duct carries a flow of heated air from the furnace to a temperature-controlled enclosure. The enclosure has an interior surface (typically a window) cooler than the normal enclosure air temperature. To increase the humidity level in the enclosure, a humidifier provides water vapor to the air in the discharge duct responsive to a humidity demand signal. A return air duct carries a flow of air from the enclosure to the furnace.

We use a load factor calculator receiving the furnace operation signal to calculate a furnace load factor, and providing a load factor signal encoding the load factor. By load factor, we mean the fraction of the total time the furnace is on between either two successive furnace startups, or two successive furnace shutdowns. Load factor may be quantified as a percentage value.

A temperature calculator receives the load factor signal and provides a window temperature signal encoding an estimated window temperature factor having a value based on the encoded load factor value and representative of the window temperature. A temperature analyzer receives the window temperature signal and responsive to certain values thereof, provides the humidity demand signal to the humidifier.

If more precision is desired, we employ a temperature sensor mounted to sense the enclosure air temperature and provide an enclosure temperature signal encoding the enclosure's air temperature. Preferably, the temperature sensor is mounted in the return air duct close to the entrance to the furnace to simplify access to the sensor. The temperature calculator derives a window temperature factor based on both the load factor and the enclosure temperature. The temperature comparator then can use this improved window temperature factor in controlling enclosure humidity.

This humidity control system can be refined even further by including a dew point calculator receiving signals from temperature and humidity sensors mounted to sense these values in the enclosure air. The values from these sensors can be used to calculate the enclosure air dew point temperature. It is usually most convenient to mount these sensors in the return air duct. The temperature calculator can derive an estimated window temperature from load factor and enclosure temperature. The analyzer can then control the humidifier to hold enclosure dew point temperature to just below the estimated window temperature.

DESCRIPTION OF THE PREFERRED EMBODIMENTS

Figure 1:
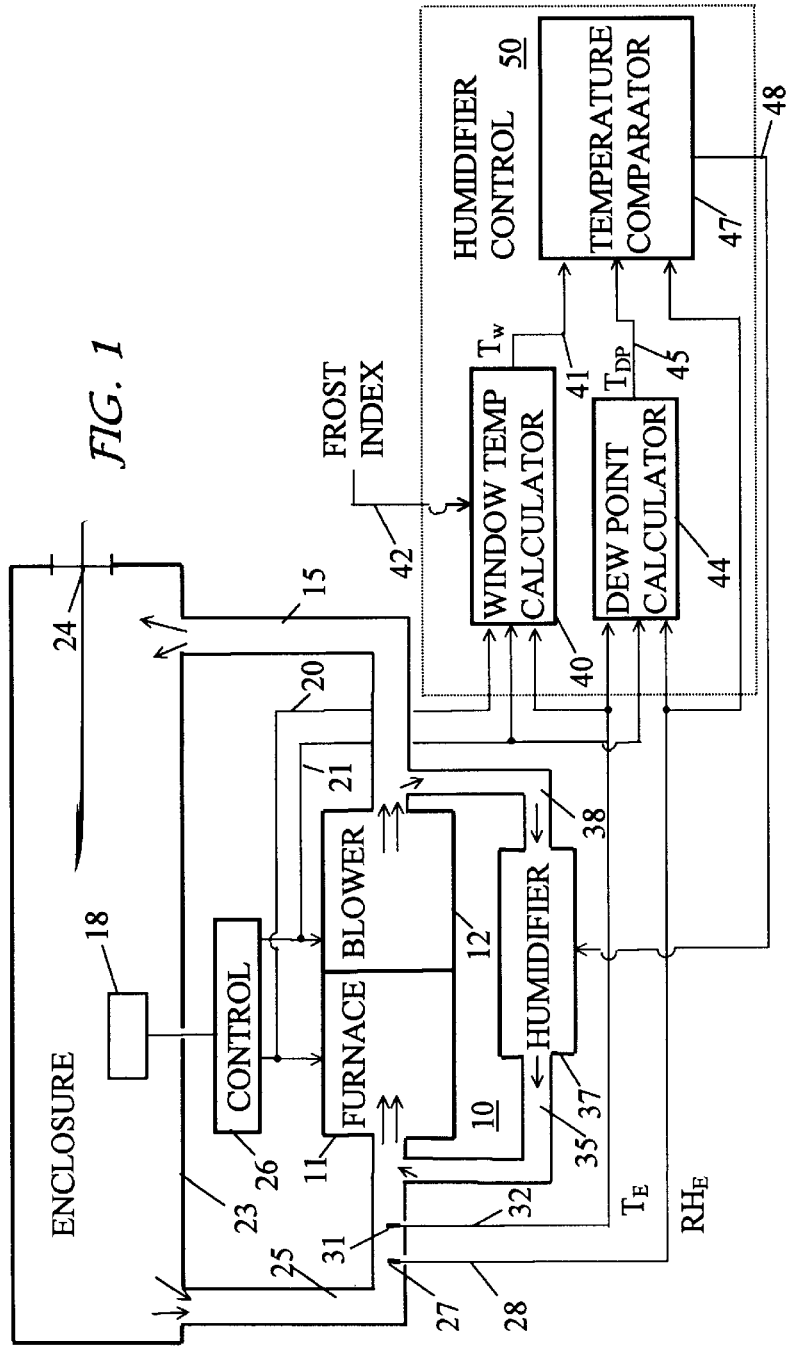
FIG. 1 is a block diagram of a heating system whose control mechanism employs the principles of the invention.

FIG. 1 discloses a heating system 10 for controlling the temperature in an enclosure 23. Installation 10 includes a furnace 11, blower 12, and humidifier 37. Enclosure 23 has a window 24 which experience shows will almost always be the coolest interior surface in enclosure 23. Furnace 11 provides heated air which is forced into enclosure 23 by blower 12 through a discharge duct 15. Furnace 11 receives cooled air from enclosure 23 through a return air duct 25. Air will usually be added into the system from the outside, either through infiltration into enclosure 23, or through a fresh air intake (not shown) actively into the return air duct 25. This outside air freshens the air within the enclosure 23, diluting and eventually removing staleness and contamination. When the outside temperature is low, this outside air has very low humidity, eventually lowering the humidity within enclosure 23 to below the comfort zone, absent some system for adding humidity to the air. Arrows within ducts 15 and 25 indicate presence and direction of air movement.

Furnace 11 and blower 12 operate responsive to furnace and blower demand signals respectively provided by a furnace controller 26 and carried on signal paths 20 and 21. The furnace and blower demand signals can also function as furnace and blower operation signals indicating that the device is in its run or operating state, since the furnace 11 or blower 12 starts to operate immediately or at worst shortly after the start of the associated demand signal.

A thermostat 18 is located within the enclosure 23. Thermostat 18 provides a thermostat signal to control 26 when temperature within enclosure 23 falls below a set point which is manually selected by the occupants of enclosure 23. The demand signal typically comprises a 24 v. AC voltage which is sufficient to operate controller 26. Controller 26 manages startup, run operation, and shutdown of furnace 11 by controlling the open or shut state of a fuel valve, operation of an igniter, operation of blower 12, and various other typical functions of furnace operation.

In a typical configuration for system 10, the furnace 11, blower 12, humidifier 37, and control 26 will all be physically grouped in close proximity. This allows easy access to signals which indicate and control these devices' operating status. Their operating status is important for implementing our invention. Parameters available from a single location are easy to access.

To address the problem of low enclosure humidity, a humidifier 37 in this embodiment is connected to receive through a duct 38 a portion of the air which blower 12 is providing to enclosure 23. When blower 12 is operating, the pressure at the entrance of duct 15 will be slightly higher than the pressure at the exit of duct 25. When a humidity demand signal is present on signal path 48, humidifier 37 opens a small water valve connected to a water supply to allow water to drip onto a pad through which the air extracted from duct 15 flows. This air flows through humidifier 37, gaining water vapor and increasing in relative humidity. This humidified air is returned to duct 25 through humidifier return duct 35. Humidifier 37 is usually controlled to receive operating power only while blower 11 is operating. This portion of the system of FIG. 1 is conventional.

The purpose of this invention is to add humidity to the air supplied to enclosure 23 sufficient for comfort but not to such a level that water will condense on window 24. This no-condensation condition exists when dew point temperature $T_{DP}$ within enclosure 23 is less than the interior surface temperature $T_W$ of that window 24 having the worst insulating characteristics of all of the windows in enclosure 23. Dew point is a well known parameter of air, and is simply the temperature at which water starts condensing out of the air. Relative humidity reaches 100% when air cools to the dew point temperature. Dew point temperature depends only on the mass of water vapor per unit mass of air, and is not dependent on air temperature (unless air temperature drops below the dew point, allowing condensation to occur). $T_{DP}$ can be calculated relatively easily from the present enclosure 23 temperature $T_E$ and relative humidity $RH_E$, although the relationship is empirical. Software algorithms exist for making this calculation for $T_{DP}$.

Thus, to prevent condensation, the system must be able to measure or estimate $T_W$, or at least determine some parameter or set of parameters from which $T_W$ can be calculated. Directly measuring $T_W$ is difficult using presently available means. It is theoretically possible to estimate interior surface temperature for various types of windows 24 if outside temperature and $T_E$ are known. However, the effects of wind, sun, proximity to the dwelling, etc. can affect the accuracy of a calculated value for $T_W$ based solely on $T_E$ and outside temperature. Not only that, outside temperature is relatively inconvenient to measure as well because the outdoor sensor must be connected by wires to the humidity control inside.

As stated, $T_W$ depends on at least the outdoor temperature, the wind strength, and $T_E$. It is intuitive that the fraction of total time a furnace will run depends closely on outdoor temperature given steady state set point temperature. Load factor LF is the percentage of time the furnace runs. Our invention estimates $T_W$ on the basis of $T_E$ and of a modified load factor LF of furnace 11 which substantially reduces the effect of changing set point temperature.

Since the term load factor in the context intended here may not be well known, we define it. A furnace achieves a desired enclosure 23 dry bulb air temperature $T_E$ by cycling on and off as $T_E$ falls and rises. Small furnaces such as furnace 11 do not allow for modulation of their heat output, and this invention is primarily intended for furnaces with fixed heat output rather than those whose output can be modulated. A furnace cycle comprises one on time and an adjacent off time either before or after the on time. The load factor is the ratio of furnace on time to the sum of that on time plus one of the adjacent off times. Thus, load factor can vary from close to 0% when the furnace 11 never operates, to nearly 100% when furnace 11 is continuously operating. For completeness, we define a situation where furnace 11 is not operating at all as 0% load factor, and one where furnace 11 operates continually as 100%.

However, using the most recent load factor value to calculate $T_W$ does not provide best possible results for a number of reasons. Sophisticated environmental control systems usually provide for temperature setback during unoccupied and sleeping times. As $T_E$ falls within enclosure 23, $T_W$ falls as well. At the same time, load factor falls dramatically, as furnace 11 enters an extended period of off time, and rises substantially during recovery from such a setback interval. Thus $T_W$ may well fall below $T_{DP}$ during a setback period and condensation on the window 24 may occur. A large and rapid drop in the outside temperature can also cause $T_W$ to fall below $T_{DP}$. Calculation of load factor is a important part of this invention. Our system calculates a modified load factor value used in lieu of the most recent on time- and off time-based load factor. We lay out in FIGS. 2a and 2b a process for calculating modified load factor values.

The insulating efficiency of various window types is also an important factor. A figure of merit called the frost index (FI) which quantifies the insulating characteristics has in the past been defined for various window types. The following table defines the approximate frost index FI for various types of windows.

| Frost Index | Window Type |
| --- | --- |
| 1 | Leaky double glazed panes which has condensation between the panes |
| 3 | Single glazed |
| 5 | Double glazed |
| 7 | Triple glazed |

We expect the occupant to identify the worst case window in the structure and determine the frost index for that window. The occupant will then enter the appropriate FI value into the humidifier control. The equation we use to determine $T_W$ has only FI, $T_E$, and modified load factor as its variables. We expect that the FI provided to the humidifier control can be altered slightly to adjust for variations in window efficiency and heating plant characteristics.

In FIG. 1, enclosure 23 humidity is controlled by humidifier control 50. Control 50 comprises the three separate functional elements shown, along with the connections shown among them. We expect that people will typically implement control 50 as a microprocessor programmed to perform the indicated functions, but this need not be the embodiment chosen.

As previously mentioned, an important consideration is for all of the inputs to control 50 to be available from nearby elements of system 10. We expect that both furnace 11/blower 12 control 26 and humidifier control 50 will all be located on or very near to furnace 11. The algorithms used by control 50 depend on parameters which are all available from system 10 and from a nearby portion of return duct 25 within which are temperature sensor 31 and relative humidity sensor 27.

Of these control 50 elements, dew point calculator 44 uses conventional empirical methods such as linear equations and table lookups to determine dew point $T_{DP}$ for enclosure 23. Dew point calculator 44 must also receive the blower control signal on path 21 since the measured values of $T_E$ and $RH_E$ will be accurate only when blower 12 is operating, and forcing air to flow in return duct 25. We will take no further notice of dew point calculator 44.

Figure 2A:
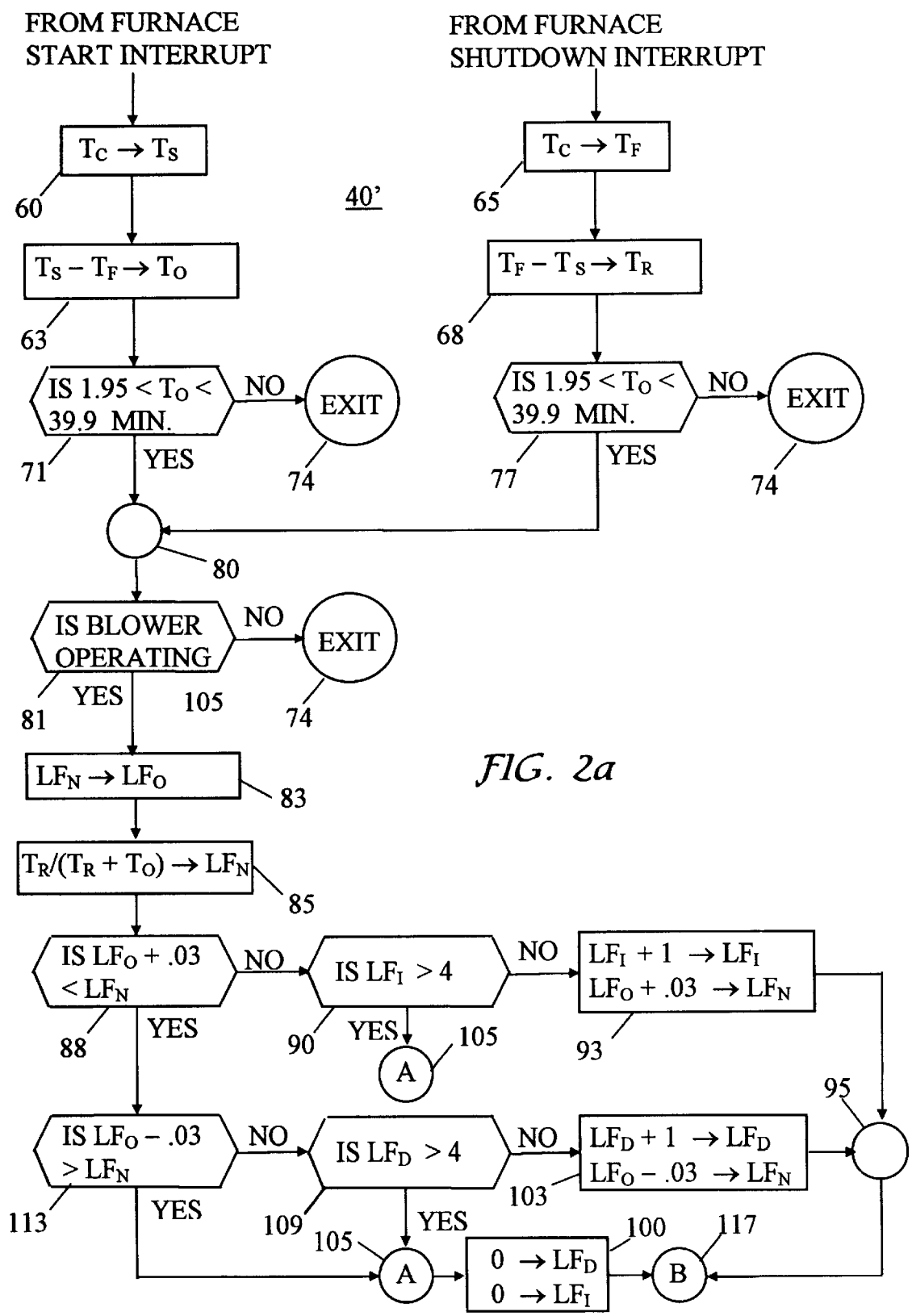
FIGS. 2a and 2b together form a flow chart of a microprocessor program which calculates an estimated window temperature as a function of enclosure temperature, window insulation characteristics, and furnace operation.
Figure 2B:
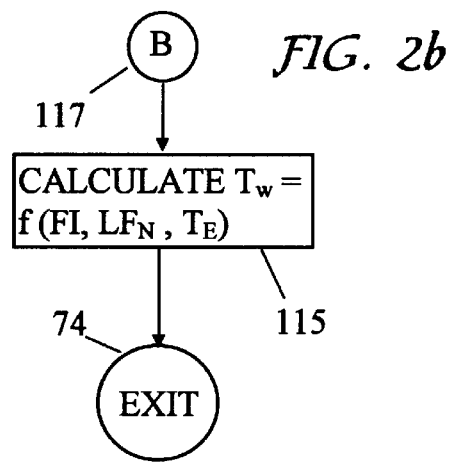
Figure 3:
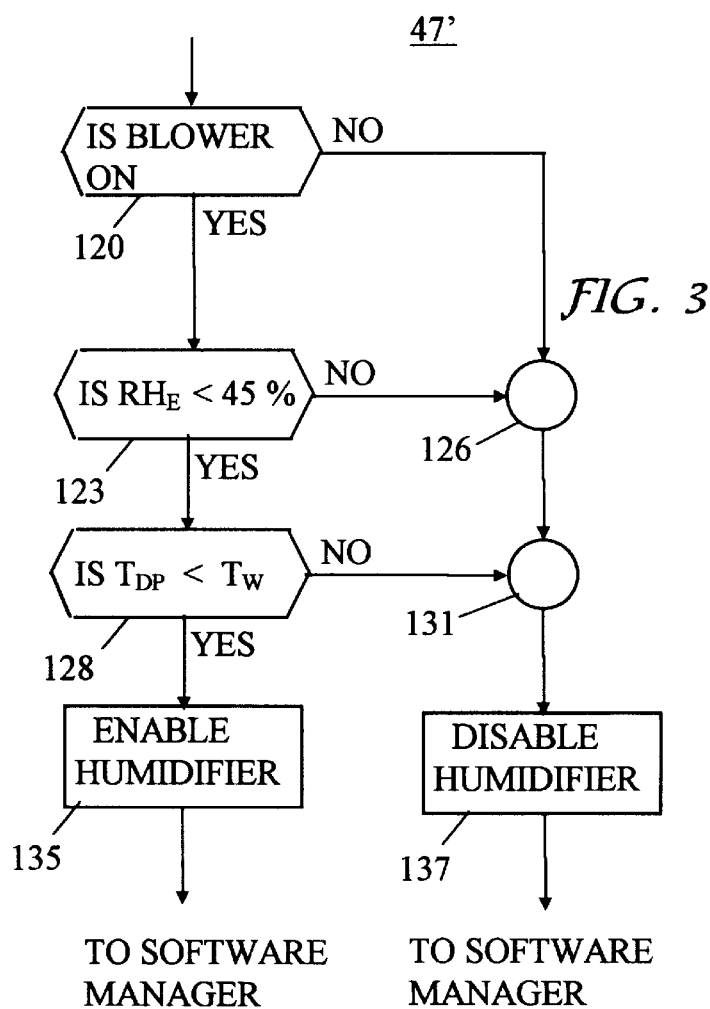
FIG. 3 is a flow chart of a microprocessor program for controlling operation of a humidifier.

Window temperature calculator 40 estimates the interior surface temperature of a window 24 based on furnace operation as measured by LF, insulation value of the selected window (window 24) in enclosure 23, and $T_E$. The window insulation value is specified in the frost index FI by the occupant or installer on a signal path 42. In most cases, the humidifier control 50 includes a simple knob which can be set to the FI value appropriate for the most poorly insulated window in the structure heated by system 10. FIGS. 2a and 2b are a flow chart for executing our preferred algorithm for estimating $T_W$ and implements the functions of calculator 40. Temperature analyzer 47 provides the functionality which controls humidifier 37 operation based on values for $T_{DP}$ and $T_W$, blower 12 operation, and $RH_E$. FIG. 3 is a flow chart which implements the functions of analyzer 47. In point of fact, analyzer 47 performs more actions than simply comparing $T_{DP}$ and $T_W$.

The reader should understand that each of the action elements forming the flow charts of FIGS. 2a, 2b, and 3 in one sense represent a hardware structure dedicated to implementing the specified software action. As the individual instructions which perform the activity specified within the action elements of FIGS. 2a, 2b, and 3 are executed, the microprocessor which executes them actually becomes for a brief period of time, a physical structure dedicated to the activity stated within that action element. Thus, it is simplest to use each of the action elements within FIGS. 2a, 2b, and 3 as actually symbolizing this structure which briefly comes into existence. We follow this view of these flow charts and their individual action elements while describing them.

The reader should also understand that even if the invention is implemented in a microprocessor, the signal paths shown in FIG. 1 and the signals the paths carry, actually have physical existence in the microprocessor. These signals are used to set the values stored in the microprocessor's memory locations, and functionally identical signals are then recreated when the data is retrieved from those memory locations during instruction execution. The mere fact that these signal paths and individual signals are not accessible to the user and that they exist only briefly, does not negate the fact that they do in fact exist.

There are two kinds of action elements in the flow charts of FIGS. 2a, 2b, and 3: what we call computation (comp) elements and decision elements. There are also connectors shown as circles which simply allow two paths to join or which specify instruction execution to unconditionally transfer to a different sequence. Progression of processing from one action element to the next is as indicated by the arrows. Comp elements perform non-decision actions such as arithmetic and storage functions and are symbolized by rectangular boxes. For example, in FIG. 2a, comp element 60 represents a device which causes a value for parameter $T_C$ to be stored in the memory cell in which is stored $T_S$, essentially setting $T_S$ to $T_C$. Decision elements determine mathematical relationships between two different numbers or logical values, and are symbolized by hexagonal boxes. In FIG. 2a, decision element 71 performs the two magnitude comparisons indicated, and if $T_O$ is outside of the specified range, takes the execution path to exit element 74.

For convenience and brevity, we have provided a list of abbreviations within FIG. 1. These abbreviations are used consistently throughout all of the FIGS. and the description. The definitions associated with each abbreviation should be sufficient to define the Turning again to FIG. 2a, action elements 60–85 calculate the new load factor on the basis of the latest run time and off time for furnace 11. We assume there is a software manager within the microprocessor which executes the instructions implementing the FIG. 2 algorithm, and which receives the furnace demand signal on path 20. The start of the furnace demand signal causes the software manager to transfer instruction execution to comp element 60. Element 60 sets the furnace start time $T_S$ to the current time $T_C$. Comp element 63 calculates a new off time $T_O$ (measured in minutes) for furnace 11. Decision element 71 tests the magnitude of To to fall within 1.95 and 39.9 minutes. If $T_O$ does not, we assume some significant change in set point, and exit at connector 74 to the software manager. This test allows the load factor to change only when the duration of an off furnace event falls within the predetermined range of 1.95 and 39.9 minutes.

At the end of each demand signal on path 20, the software manager causes an interrupt to comp element 65, which sets the value of $T_F$ to the current clock value $T_C$. Comp element 68 calculates the duration of the most recent furnace run time $T_R=T_F-T_S$ (minutes). $T_R$ is also tested for acceptable magnitude by decision element 77, and if not acceptable, causes execution to return to the software manager. If the tests performed by decision elements 71 and 77 both find their variables within the specified ranges, then instruction execution continues to decision element 81 through connector 80. At this point $T_O$ and $T_R$ are set to the latest values for furnace 11 off and run times. This test allows the load factor to change only when the duration of a run event falls within the predetermined range of 1.95 and 39.9 minutes.

Decision element 81 tests whether blower 12 is operating by sensing the presence of a blower operation signal on path 21. If blower 12 is not operating, then humidity and temperature values measured in return duct 35 may not be accurate, which will affect the accuracy of calculations based on them. If blower 12 is not operating, instruction execution returns to the software manager. If blower 12 is operating, then operation continues with comp element 83.

Action elements 83 through 113 calculate a raw load factor based on the present values of $T_O$ and $T_R$, and then filter this load factor value further to allow consistent calculation of $T_W$. The filter process relies on limiting the change in load factor to a maximum of three percentage points for four consecutive load factor computations before allowing any larger change. Thus it is necessary to set the old value of load factor $LF_O$ to the present new load factor value $LF_N$, which is the function of comp element 83. Comp element 85 calculates the new raw value of LF as equal to $T_R/(T_R+T_O)$ and stores this value as $LF_N$.

Decision elements 88 and 113 test whether the newly calculated value $T_N$ has changed more than three percentage points from its previous value. If $T_N$ has increased at least three percentage points, then a load factor increment index $LF_I$ is tested by decision element 90 to be greater than four. If this test is passed then instruction execution transfers to comp element 100 through connector A 105. If this test is not passed, then instruction execution continues with the instructions which comp element 93 symbolizes. Element 93 increments $LF_I$ by one and sets $LF_N$ to $LF_O+0.03$. Instruction execution then passes to the instructions of comp element 115 through connector 117.

Decision elements 113 and 109 and comp element 103 perform similar operations on $LF_O$ and $LF_N$. Decision element 113 tests whether the newly calculated value $T_N$ has decreased at least three percentage points. If so, then a load factor decrement index $LF_D$ is tested by decision element 90 to be greater than four. If this test is passed then instruction execution transfers to comp element 100 through connector A 105. If this test is not passed, then instruction execution continues with the instructions which romp element 103 symbolizes. Element 103 increments $LF_D$ by one and sets $LF_N$ to $LF_O-0.03$. Instruction execution then passes to the instructions of comp element 115 through connector 117. In essence, load factor is allowed to change only three percentage points during each successive calculation, until four successive changes in excess of three percentage points are calculated.

If the test performed by either decision element 90 or 109 is passed, then $LF_N$ is left as previously calculated by the instructions of decision element 85. Also, if the present value of $LF_N$ has changed by less than 0.03, then execution of instruction transfers to comp element 100 through connector A 105. Comp element 100 clears the values of $LF_D$ and $LF_I$ execution continues with comp element 115.

Comp element 115 then computes $T_W$ as a function of frost index FI, latest load factor $LF_N$, and enclosure temperature $T_E$. There may be a number of suitable formulae which can calculate $T_W$ from these values. One which we find to be quite satisfactory is the following:

$$T_W=T_E[1-(10-FI)(LF_N/450)]-8$$

The value for $T_W$ provided by this equation represents an excellent approximation for the actual $T_W$ in most situations, and is stored for processing by the instructions of FIG. 3.

Where we can assume a fixed value for $T_E$, say 68° F., we can rewrite this equation as $T_W=60-0.151LF_N(10-FI)$ This equation is independent of $T_E$, and allows simpler but cruder control of enclosure 23 humidity level.

While these two equations compute an estimated inside window temperature, it is clear that actual estimated $T_W$ need not be calculated. Instead a window temperature factor which is no more than representative of $T_W$ might be calculated. This factor can be arbitrary, or could have an actual physical meaning. For example, by suitably modifying the above equations, they can be made to provide an approximation of outside temperature. We submit that outside temperature is representative of $T_W$ since true $T_W$ can be straightforwardly derived from outside temperature and $T_E$. If $T_W$ is a function of $T_E$ and LF, then outside temperature is also a function of $T_E$ and LF. In fact, there may be other comfort control and improved efficiency uses for an estimated outside temperature based on LF and $T_E$.

FIG. 3 implements the functions assigned to analyzer 47. We assume that $T_{DP}$ for enclosure 23 has been previously calculated and a current value is available for use by the software depicted by FIG. 3. At periodic intervals, the software manager transfers instruction execution to decision element 120, which tests whether blower 12 is currently operating. Note that in FIG. 1, signal path 21 which carries the blower demand signal is one input to analyzer 47. If control 26 is not providing a blower demand signal then instruction execution proceeds through connectors 126 and 131 to a comp element 137 which ends any demand signal currently provided to humidifier 37 on path 48.

If blower 12 is detected as operating by decision element 120, then instruction execution proceeds to the instructions of decision element 123. These instructions test whether the present value of $T_{DP}$ is less than 50° F. If $T_{DP}$ is 50° F. or greater, than the level of humidity in enclosure 23 is adequate, and humidifier 37 need not operate at the present time. Instruction execution proceeds again to comp element 137 through connectors 126 and 131.

Next, $T_{DP}$ is tested to be less than $T_W$. If this is true, then humidity can be added to the air supplied to enclosure 23 without condensation occurring on window 24. In this case, execution proceeds to comp element 135 which causes a humidifier demand signal to be supplied to humidifier 37 on path 48. If $T_{DP}>T_W$ then condensation on window 24 can occur. Typically systems do not attempt to actively remove humidity from the air within enclosure 23. However, a relatively low $T_W$ implies a relatively low outside temperature, which means that the outside air carries relatively little water vapor. As this outside air is added to the enclosure 23 air over a period of an hour or two, humidity within enclosure 23 will fall without any specific attempt to lower enclosure 23 humidity.

On occasion, the occupants may find that some condensation does occur on a window 24. If this happens, then the frost index provided on path 42 should be reduced slightly to compensate. Normally, the approximation for $T_W$ provided by the equation above and the calculation of $LF_N$ will allow $T_W$ track the changes in outside temperature and $T_E$, and eliminate condensation on window 24, while at the same time maintaining a dew point temperature $TD_P$ within enclosure 23 as high as possible and below 50° F.

What is claimed is:

1. A humidity controller for a forced air heating system, said system having a furnace and providing a furnace operation signal, a discharge duct for carrying a flow of heated air from the furnace to a temperature-controlled enclosure, said enclosure having an interior window surface cooler than the normal air temperature, a humidifier providing water vapor to the air in the discharge duct responsive to a humidity demand signal, and a return air duct carrying a flow of air from the enclosure to the furnace, said humidity controller including:

a) a load factor calculator receiving the furnace operation signal, and responsive thereto calculating the furnace load factor, and providing a load factor signal encoding the load factor;

b) a temperature calculator receiving the load factor signal, and providing a window temperature signal encoding a window temperature factor indicative of the estimated window temperature and based on the load factor signal; and c) a temperature analyzer receiving the window temperature signal and responsive to certain values of the window temperature factor encoded therein, providing the humidity demand signal to the humidifier.

2. The controller of claim 1 including a temperature sensor mounted to sense the enclosure air temperature and providing an enclosure temperature signal encoding the enclosure's air temperature, and wherein the temperature analyzer receives the enclosure temperature signal and further includes structure for providing the humidity demand signal to the humidifier based on the window temperature factor and the enclosure temperature signal.

3. The controller of claim 2 wherein the temperature calculator includes structure for providing a window temperature signal encoding an estimated window temperature based on both the load factor signal and the enclosure temperature.

4. The controller of claim 3 including a humidity detector within the enclosure air and providing a humidity signal, and a dew point calculator receiving the humidity signal and a providing a dew point signal encoding the dew point temperature within the enclosure; and wherein the temperature analyzer includes structure receiving the window temperature signal and the dew point temperature signal, and providing the humidity demand signal responsive to the temperature value encoded in the window temperature signal exceeding the temperature value encoded in the dew point temperature.

5. The controller of claim 4, wherein the temperature calculator includes structure receiving a frost index signal encoding a frost index value indicating the insulation value of a window of the enclosure, and providing the window temperature signal as a function of the frost index value.

6. The controller of claim 5, wherein the temperature calculator computes a mathematical expression of the type $T_W=T_E[1-(A_1-FI)(LF/A_2)]-A_3$, where $T_W$ is estimated window temperature; $T_E$ is enclosure temperature; $A_1$, $A_2$, and $A_3$ are positive constants; FI is the frost index value encoded in the frost index signal and is a positive value between 0 and $A_1$; and LF is the current load factor for the furnace and is between 0 and $A_2$.

7. The controller of claim 6, wherein FI ranges between the value of 1 and 9 and $A_1$ is at least 10.

8. The controller of claim 7, wherein $A_3$ is less than 10.

9. The controller of claim 6, wherein the temperature calculator includes a load factor calculator receiving the furnace operation signal, and providing a load factor value LF which changes responsive to a duration of a predetermined state of the furnace operation signal which fall within a predetermined range.

10. The controller of claim 6, wherein the temperature calculator includes a load factor calculator receiving the furnace operation signal, and providing a load factor value LF which changes no more than a predetermined amount from the previous calculated load factor.

11. The controller of claim 10, wherein the load factor calculator includes structure providing a load factor value LF which changes no more than a predetermined amount from the previous calculated load factor for a predetermined number of successive calculations.

12. The controller of claim 3, wherein the temperature calculator computes a mathematical expression of the type $$T_W = 60 - A_1 LF_N (A_2 - FI)$$

where $T_W$ is estimated window temperature; $A_1$ and $A_2$ are positive constants; FI is the frost index value encoded in the frost index signal and is a positive value between 0 and $A_2$; and LF is the current load factor for the furnace.

13. The controller of claim 2, including a blower mounted in the discharge duct to force air into the enclosure, wherein the temperature sensor is mounted in the return air duct, and wherein the temperature calculator conditions providing the window temperature signal on presence of the blower operation signal.

* * * * *